United States Patent
Johnson

(10) Patent No.: US 6,176,720 B1
(45) Date of Patent: *Jan. 23, 2001

(54) ELECTRICAL DISTRIBUTION SYSTEM HAVING AN IMPROVED BUS COUPLER

(76) Inventor: Terry M. Johnson, 4300 Jewel La., Minneapolis, MN (US) 55446

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/079,038

(22) Filed: May 14, 1998

Related U.S. Application Data

(62) Division of application No. 08/963,684, filed on Nov. 3, 1997, now Pat. No. 5,785,542, which is a continuation of application No. 08/601,735, filed on Feb. 15, 1996, now abandoned.

(51) Int. Cl.[7] ..................................................... H01R 4/60
(52) U.S. Cl. .......................................... 439/213; 174/88 B
(58) Field of Search .................................... 439/210, 213, 439/212; 174/70 B, 71 B, 72 B, 88 B, 99 B, 268

(56) References Cited

U.S. PATENT DOCUMENTS

| | | | | |
|---|---|---|---|---|
| Re. 26,310 | * | 11/1967 | Moodie et al. .................... | 174/99 B |
| 3,189,680 | * | 6/1965 | Stanback ............................ | 174/99 B |
| 3,339,009 | * | 8/1967 | Davis et al. ....................... | 430/212 |
| 3,376,377 | * | 4/1968 | Fehr ................................... | 174/88 B |
| 3,504,100 | * | 3/1970 | Yatabe ............................... | 174/88 B |
| 4,097,103 | * | 6/1978 | Krause ............................... | 174/88 B |
| 4,842,533 | * | 6/1989 | Beberman et al. ................ | 174/88 B |
| 4,886,940 | * | 12/1989 | Gagnon et al. .................... | 174/88 B |
| 4,945,188 | * | 7/1990 | Jackson ............................. | 174/88 B |
| 4,979,906 | * | 12/1990 | Shrout et al. ...................... | 174/88 B |
| 5,401,906 | * | 3/1995 | Bryant ............................... | 174/70 B |
| 5,760,339 | * | 6/1998 | Faulkner et al. .................. | 174/88 B |

* cited by examiner

*Primary Examiner*—T. C. Patel
(74) *Attorney, Agent, or Firm*—Janet Peyton Schafer

(57) ABSTRACT

An electrical bus assembly, having pairs of bus conductors in communication with each other, housed in a housing, for use in an industrial setting. The pairs of bus conductors are themselves used to form a joint without the need of additional apparatus. A first coupling embodiment provides a two-piece clamp having a built-in depression formed therein for applying additional clamping pressure when bolted to the housing surrounding a layered pair of bus conductors. Mylar™ film is provided for insulating the pair of bus conductors from both the housing and other pairs of bus conductors within a bus assembly. The electrical bus assembly is adaptable to a variety of electrical loads, and is reusable. A second coupling embodiment provides a slotted connecting bus conductor, received by a pair of stationary bus conductors housed in a panel box housing. Fiberglass board insulation isolates the bus conductors from the housing and positions the pair of stationary bus conductors in a spaced apart position for receipt of the slotted bus conductor. When the slotted connecting bus conductor is in position sandwiched between the pair of stationary bus conductors, electrical current passes through all bus conductors. An insulated bolt passes through the housing and the electrical bus conductors for securing the coupling. Either coupling embodiment may be used to form an elbow-shaped joint, a tap-off, or a T-shaped joint.

3 Claims, 8 Drawing Sheets

ELECTRICAL DISTRIBUTION SYSTEM HAVING AN IMPROVED BUS COUPLER

This is a division of Ser. No. 08/963,684, filed Nov. 3, 1997, now U.S. Pat. No. 5,785,542 which was a continuation of Ser. No. 08/601,735, filed Feb. 15, 1996, now abandoned, incorporated herein by reference.

BACKGROUND

This invention is directed to the field of electrical conductors and more particularly to electrical bus and means for coupling electrical bus.

An electrical bus is a rigid electrical conductor that serves as a common connection between the source of electric power and the load circuits. Bus duct or busway is a prefabricated conduit used to enclose and protect bus running therethrough. Because of the power required in industrial settings, electrical bus, because it can handle heavier electrical loads, has been used in place of circuits and wiring. Ordinarily, bus duct assemblies for electrical distribution systems consist of factory assemblies of bus conductors in straight section lengths having at least one end of which is bent from straight to a spread apart position for coupling to other lengths of bus conductor by means of special fittings for joining the lengths. Prior art electrical bus has taught use of separate couplings to connect or to couple electrical bus. One of these prior art structures teaches a splice connector having multiple components, including multiple main phase connector plates, inner insulators, outer insulators, splice plate, a square-shaped bolt insulating tube for insulating a bolt, used to draw the plates together. Another discloses a connection block having conductive splicing pads that abut a bus and couple the bus to another such conductor bus, by means of hooks or the like carried by the splicing pads, the assembly held in place with bolts and dimpled washers. Other previous patents have taught use of pronged couplers for connecting adjacent bus.

U.S. Pat. No. 4,008,365 Carlson, discloses paired phases of bus duct in which a pair of different types of bus duct, each surrounded by an insulation layer, are combined e.g. an A phase combined with a B phase, or an A phase combined with a C phase type bus conductor. A neutral phase has also been shown with this type of paired phase bus conductor.

All previous attempts at coupling electrical bus require connectors that have multiple components that, in addition to adding to the cost of manufacture, add complexity to the installation. An additional problem has been the inability to carry the required electrical load needed in industrial settings. Another problem has been the difficulty in adapting standard pieces of bus and couplings to the particular dimensions of an individual job. It has been very difficult to field cut the previous bus to the appropriate lengths because the previously used bus duct, because it was not flat throughout but had spaced apart ends at at least one end of the bus conductor, had to be manually taken apart, the connectors detached, the bus individually cut, reassembled and the multi-component connectors re-attached. A further problem has been the cost associated with single-use bus which increases costs when relocating electrically powered equipment requiring installation of new bus.

SUMMARY

The present invention is directed to a bus that satisfies the needs for a reusable, easily installed and easily coupled bus that can be adjusted on site to the required dimensions and can carry a large amperage load. The present invention is directed to an electrical bus assembly having features of the present invention comprising an upper layer of flat, elongated metal bus conductor and a lower layer of flat, elongated metal housing bus conductor forming a bus pair, enclosed in a metal with insulation between the bus pair and the housing. The bus assembly consists of two layers of similar type of bus, example two layers of A phase, two layers of B phase, or two layers of C phase bus. The bus assembly where the housing is a two-piece U-shaped housing of an upper channel and a lower channel, each channel having a pair of flanges, and where the bus itself, because it is flat throughout, is coupled without the need for a separate coupler. A conductor element, having two metal buses, of similar electrical type, in contact with each other forming a bus pair, enables safe and economic conduction of the larger amperage current. The metal bus of each bus pair are positioned step-wise such that the ends of the two metal bus are not in alignment but, because they are the same length, the upper layer overlaps the lower layer at one end and underlaps the lower layer at the opposite end. This step-wise arrangement enables easy coupling of two conductor elements, each having step-wise positioned metal bus pairs, by abutting the two metal bus of the first conductor element with the two metal bus of the second conductor element, forming a pair of butt joints that are not aligned so no seam is produced. Because the upper layers and lower layers overlap at one end and underlap at the opposite end, they both abut and overlap. In this manner, the adjoining conductor elements form a joint that maintains a strong conductive element across the joint. The joined conductor elements are held in place by a two-piece clamp having a depression formed in each piece for applying additional clamping pressure at the site of the joint. The conductor elements may be field cut on-site to the desired dimensions by manually positioning the metal bus within one conductive element in alignment with each other, and cutting simultaneously through the layers with a hacksaw or other metal cutting means, as needed. The pairs of bus are then manually repositioned, forming butt joints with other conductor units, and the housing and clamp reapplied. Mylar® insulation lines the metal busway housing. Mylar® insulation also is adhered to one longitudinal side of each bus. The bus adjacent the housing is positioned so that the bus insulation lies adjacent the housing, thereby providing two layers of insulation between the bus and the housing. The bus bar pairs are positioned with the insulation side out, providing two layers of insulation between the bus pair and other metal, be that either the housing or an adjacent bus pair similarly positioned. The bus bar pairs are positioned metal to metal. The joined conductor units may be releasably attached to the building structure by means of the fasteners through apertures along two edges of the housing, and, when electrical machinery needs to be moved, the conductor elements using this bus system may be easily removed and easily reinstalled in the new location. Each conductor element may comprise a plurality of metal bus pairs, to accommodate differing amounts of electrical current sought to be transferred.

A second embodiment, for providing increased electrical loads, utilizes a pair of stationary bus conductors having a wider, thicker body, having a pair of central apertures formed therein for receipt of an insulated bolt and spaced apart by insulation discs of fiberglass board insulation material, for receipt of a slotted bus connector between the pair of stationary bus conductors. A second pair of stationary bus conductors, also having a pair of central apertures formed in each, and also in a spaced apart position, is provided for coupling to the first pair of stationary bus conductors by the slotted bus connector, the slotted connecting bus conductor being received between both the first and second pairs of stationary bus conductors. The coupling of the pair of bus conductors is held in place by means of an insulated bolt received through a central bore in the body of the pair of stationary bus conductor and the slot of the slotted bus connector.

BRIEF DESCRIPTION OF THE DRAWINGS

Understanding of the invention will be enhanced by referring to the accompanying drawing, in which like numbers refer to like parts in the several views and in which.

DETAILED DESCRIPTION OF THE CURRENTLY PREFERRED EMBODIMENTS

Figure 1:
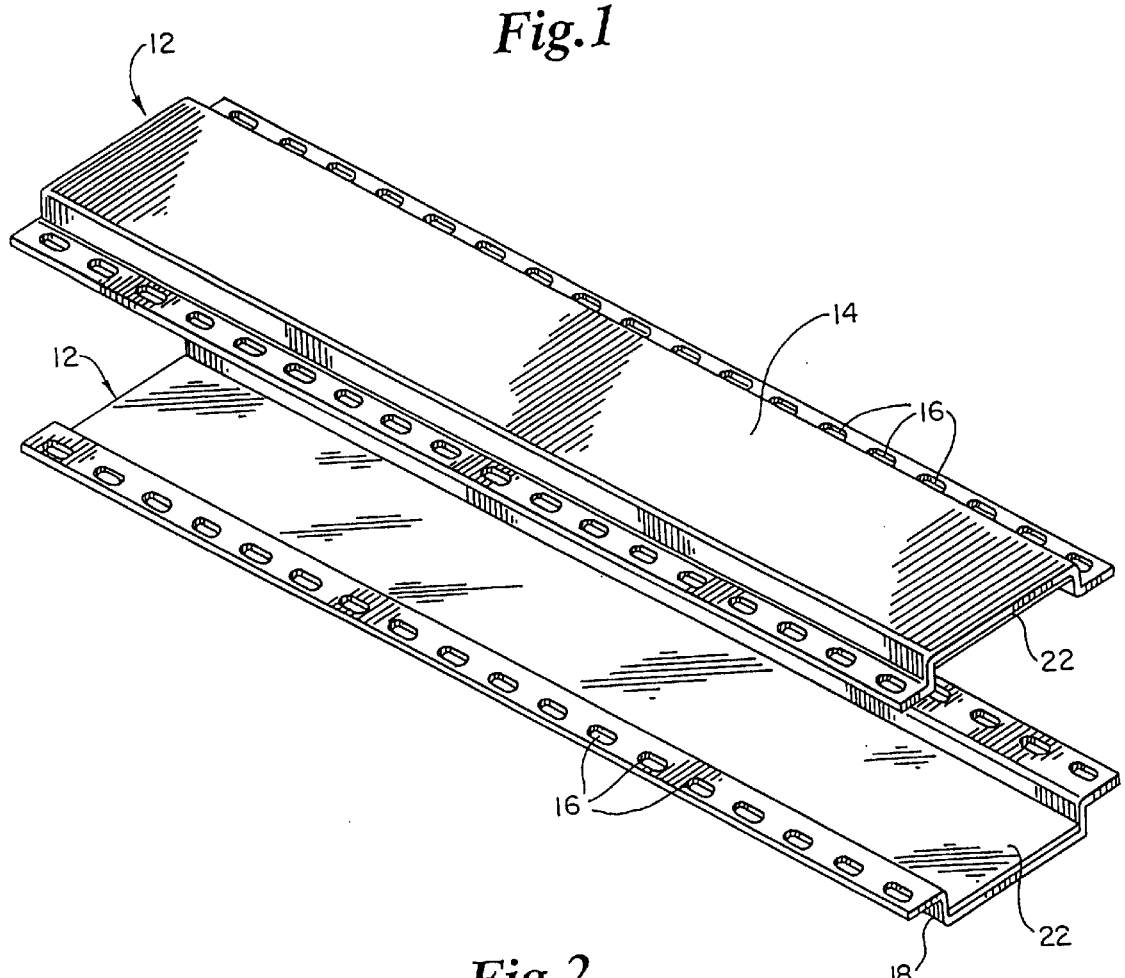
FIG. 1 is an exploded perspective view of upper and lower bus channels.

Understanding of the invention will be further enhanced by referring to the following illustrative but nonlimiting examples.

The product of this invention shown in FIGS. 1–8 is an electrical bus assembly that couples with another bus assembly by forming a butt joint. The bus assembly consists of two layers of similar type of bus, example two layers of A phase, two layers of B phase, or two layers of C phase bus, and is not the same as "paired phasing" where two dissimilar layers of phase, each individually insulated, are combined. In accordance with the invention, flat paired layers of bus within one assembly are placed into position abutting the paired layers of bus in another assembly, forming a series of butt joints. Because the ends of the paired layers of bus are positioned in step-wise fashion, the bus ends of one bus assembly are not aligned with the ends of bus of the second bus assembly. This joint of both abutment and overlap of the layers of bus pairs, is clamped by a two-piece clamp. A dimple formed in the two-piece clamp provides additional clamping pressure to secure such a coupling. Electrical insulation, in the form of Mylar® polyester film, is applied to one side of each bus and to the housing, providing a double layer of insulation between the bus and the housing. Because the bus pairs are positioned metal to metal, the outside edge of each bus has the layer of insulation adhered thereto. When additional layers of bus pairs are positioned adjacent each other, the electrical insulation layer of the two sets of bus pairs is positioned adjacent each other, again providing a double layer of insulation between the bus pair and the metal of the adjacent bus pair. Electrical current passing through one bus passes through its adjacent bus in each bus pair. This bus assembly 10 is provided for use with electrical currents up to 800 amp.; although it can be used at higher amperages, however, it is not economically practical to do so. A second embodiment, illustrated at FIGS. 9–17, is provided for economic use with higher amperages. In the second embodiment 80, illustrated at FIGS. 9–17, bus pairs 104A, 104B are thicker and wider and couple by sandwiching a connecting bus 90 therebetween. In this embodiment the paired bus 104A, 104B are positioned near to each other, spaced apart by insulation discs 106A until receipt of the connecting bus 90. A series of pairs of paired bus 104A, 104B are isolated from each other by insulation discs 106. The connecting bus 90 is slotted at the ends thereof. When in position, connecting bus 90 displaces insulation discs 106A and forms an electrical connection with both of the bus pair 104A, 104B. An insulated bolt 100 positions and clamps this second embodiment together. In both embodiments, one has a stacked series of paired bus with the same current, supplied by a single source, flowing through each.

Turning now to the drawings, in which like reference characters refer to corresponding elements throughout the several views, FIG. 1 illustrates a metal elongated bus housing 12 consisting of inverted U-shaped top bus channel 14 and U-shaped bottom bus channel 18 having ends 19 and 21. Steel is currently preferred for making bus channels 14 and 18 but other metals, such as aluminum, plated aluminum, chromium, tin, silver, or gold could also be utilized. Bus channels 14 and 18 are joined to form the bus housing 12, which provides an electrical ground. Adhered to the inside edge of both top bus channel 14 and bottom bus channel 18 is insulation strip 22, which must be at least as wide as metal bus 20 shown at FIG. 2. In actual use conditions, 750 gauge (7.5 mm) Mylar® strip insulation, made by E. I. duPont de Nemours & Co., is currently preferred, although other thicknesses of Mylar® or other insulations could be used. Two layers of insulation 22, one adhered to the bus channel 14, 18, one adhered to a surface of bus 20 are positioned between bus 20 and bus channels 14, 18. Because a layer of insulation 22 is adhered to one side of each bus conductor 20, two layers of insulation 22 are positioned between adjacent bus pairs 20A,20B shown at FIG. 3. All insulation strips 22, in actual use conditions, are attached to the bus 20A,20B and housing channels 14 and 18 with #924 double stick adhesive tape, made by Minnesota Mining and Manufacturing Co., although other adhesives could be used or other non-conductive means for fastening insulation strips to bus and or housing could be used. Plated aluminum, plated by the Alstan™ 80 process, is currently preferred for making bus 20A,20B but other metals, including tin, silver, gold, chromium or copper, could be used.

Figure 2:
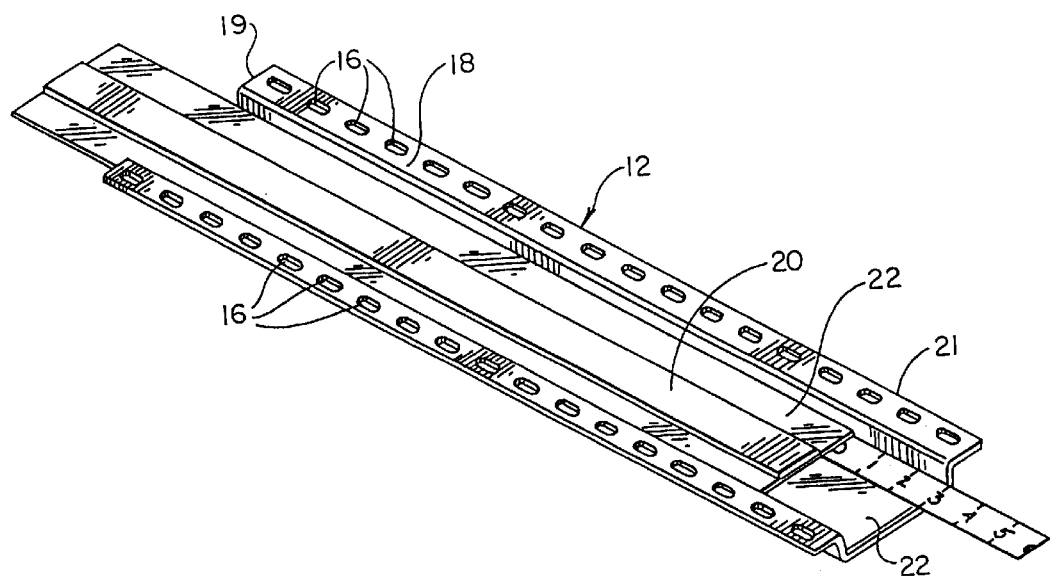
FIG. 2 is a perspective view of the lower bus channel, showing a bus and an insulating strip.
Figure 3:
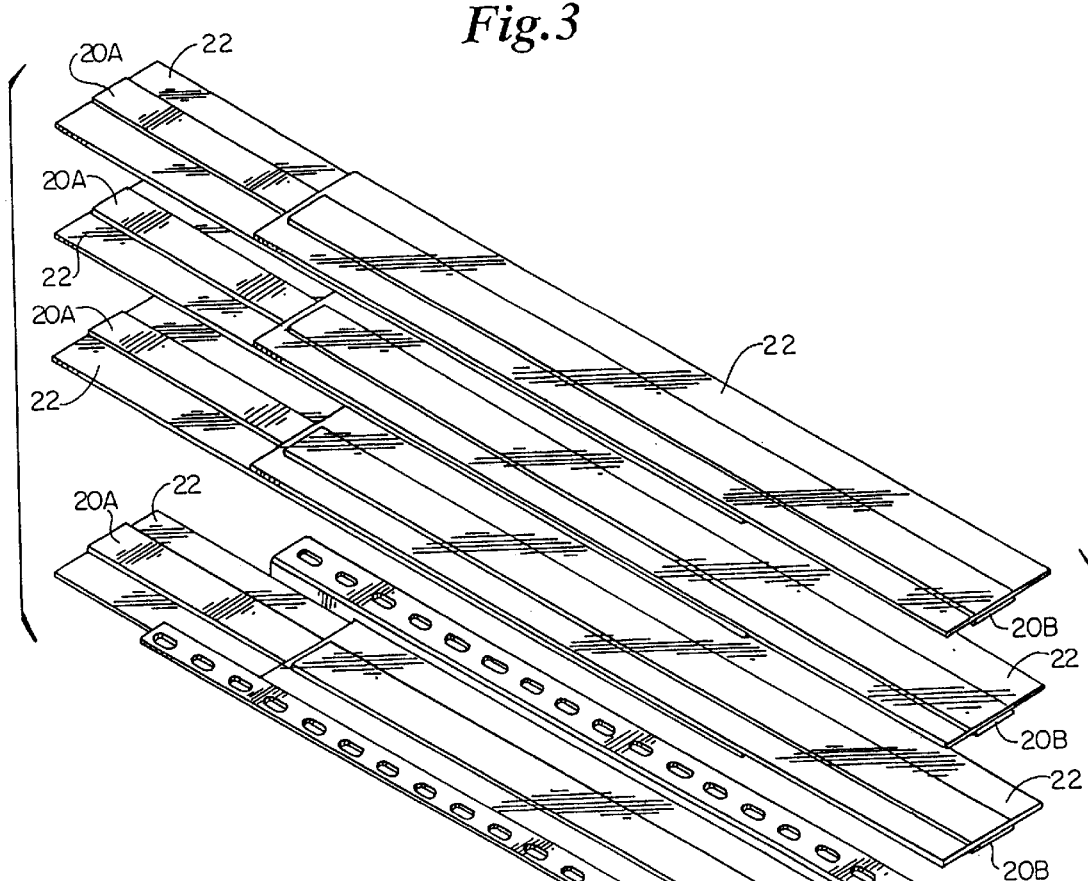
FIG. 3 is an exploded perspective view showing the lower bus channel with a plurality of bus strips in location before assembly.
Figure 4:
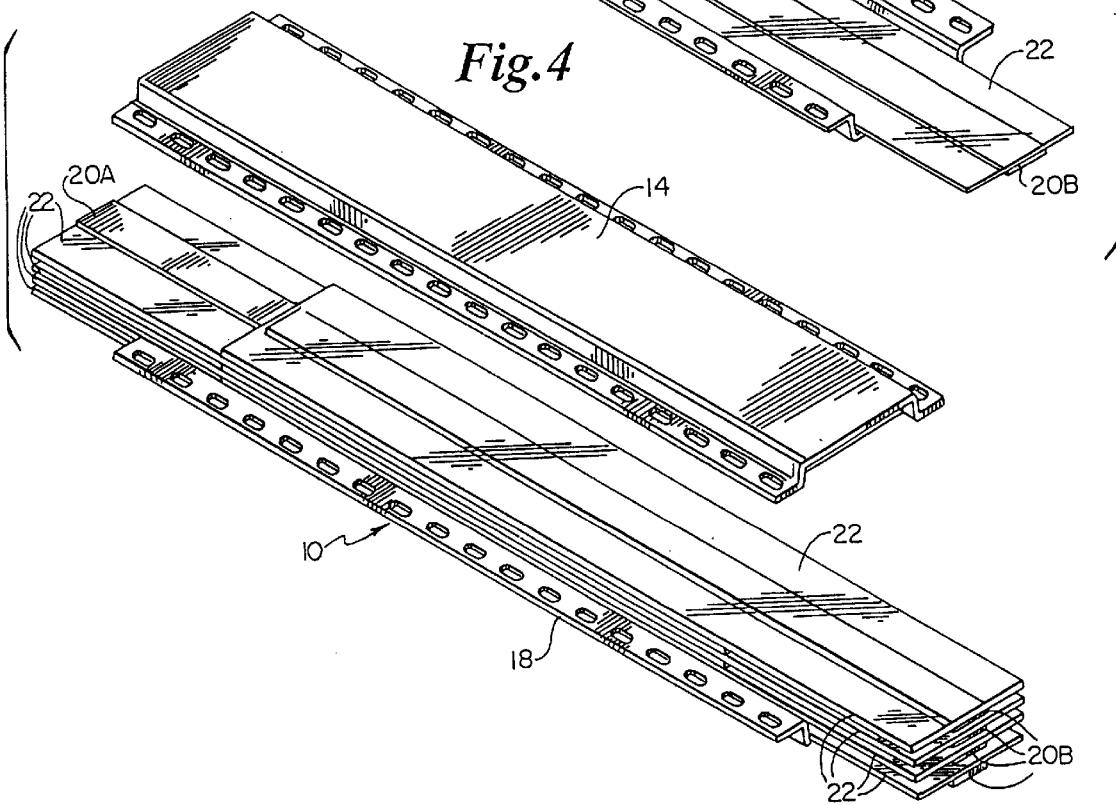
FIG. 4 is an exploded perspective view similar to FIG. 3, showing the bus strips in superimposed position on the lower channel with the upper channel in position for assembly.

FIG. 2 illustrates bottom bus channel 18, in actual use conditions of steel although other metals, such as tin, chromium, silver, gold or copper could be used, the bus channel 18 lined with insulation strip 22. Bus housing 12 and bus 20A,20B are of the same length. Bus 20A, with insulation strip 22 adhered to a bottom surface thereto in the manner described above, is positioned so that it extends beyond end 19 of bottom bus channel 18. Because it is the same length as bus channel 18, extending bus 20A beyond end 19 withdraws a second end of bus 20A' from end 21 of bus channel 18. As is shown in FIG. 3, an additional bus 20B, with accompanying insulation strips 22 adhered to a top surface thereof, may be positioned on top of a bus 20A so the two metal bus 20A 20B adjoin and electrically communicate along their adjoing lengths. Multiple bus pairs 20A,20B may be thus formed within a single bus assembly 10. Bus 20B is positioned so that it overlaps bus channel 18 at end 21. In this manner, two layers of bus 20A & 20B are positioned together, the metal touching, one layer of bus 20A protruding from the end 19 of channel 18, one layer of bus 20B protruding from end 21 of channel 18. Insulation strips 22, adhered to bus channels 14, 18 and one side of each bus 20A & 20B, insulates the layered bus pairs 20A & 20B from both the bus channels 14, 18 and from other sets of bus pairs 20A & 20B, illustrated at FIG. 3. Two layers of insulation 22 separate each bus 20A & 20B pair from other bus pairs 20A & 20B. Top bus channel 14 is aligned with bottom bus channel 18 and fastened by screws and nuts applied through screw holes 16, with bus 20A overlapping end 19 of bottom bus channel 18 while bus 20B overlaps end 21 of bottom bus channel 18.

Having the double layered bus 20A & 20B enables, in addition to ease of coupling, higher quantities of electricity to be carried by the bus assembly 10, i.e. up to 800 amperes. This ability to carry more current is particularly helpful in an industrial setting. The higher the amperage, the bigger the metal bus needs to be, either in thickness or width, to accommodate the electrical current. The second embodiment, detailed below, provides a bus assembly that may carry amperages greater than 225 amperes.

Figure 5:
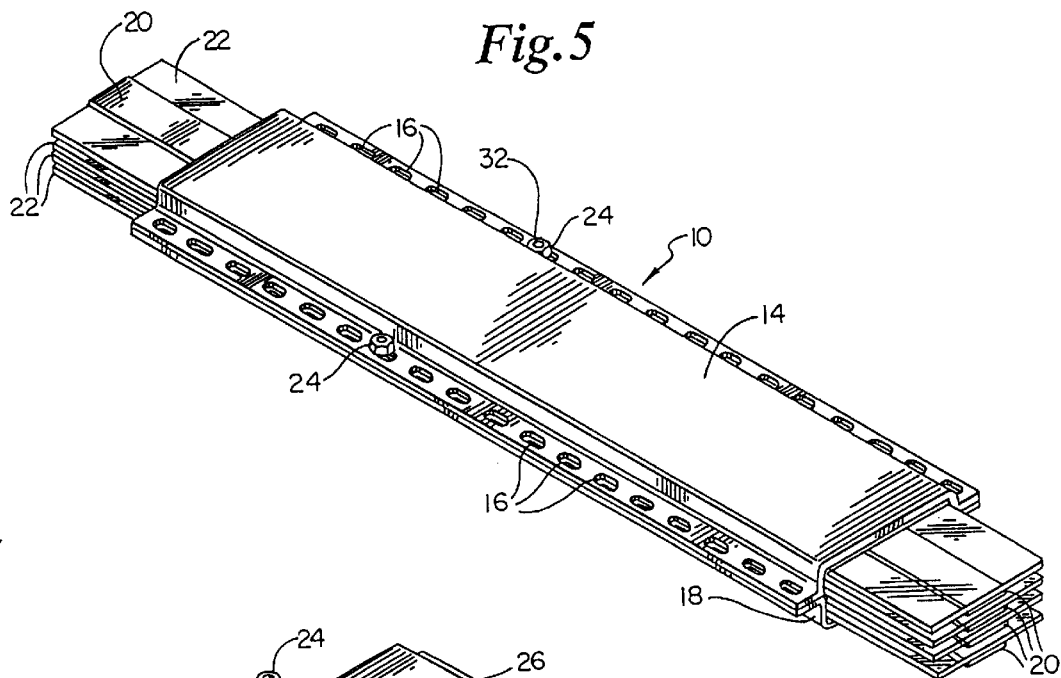
FIG. 5 is a perspective view of the article of FIG. 4 showing the upper and lower channels connected to each other.
Figure 6:
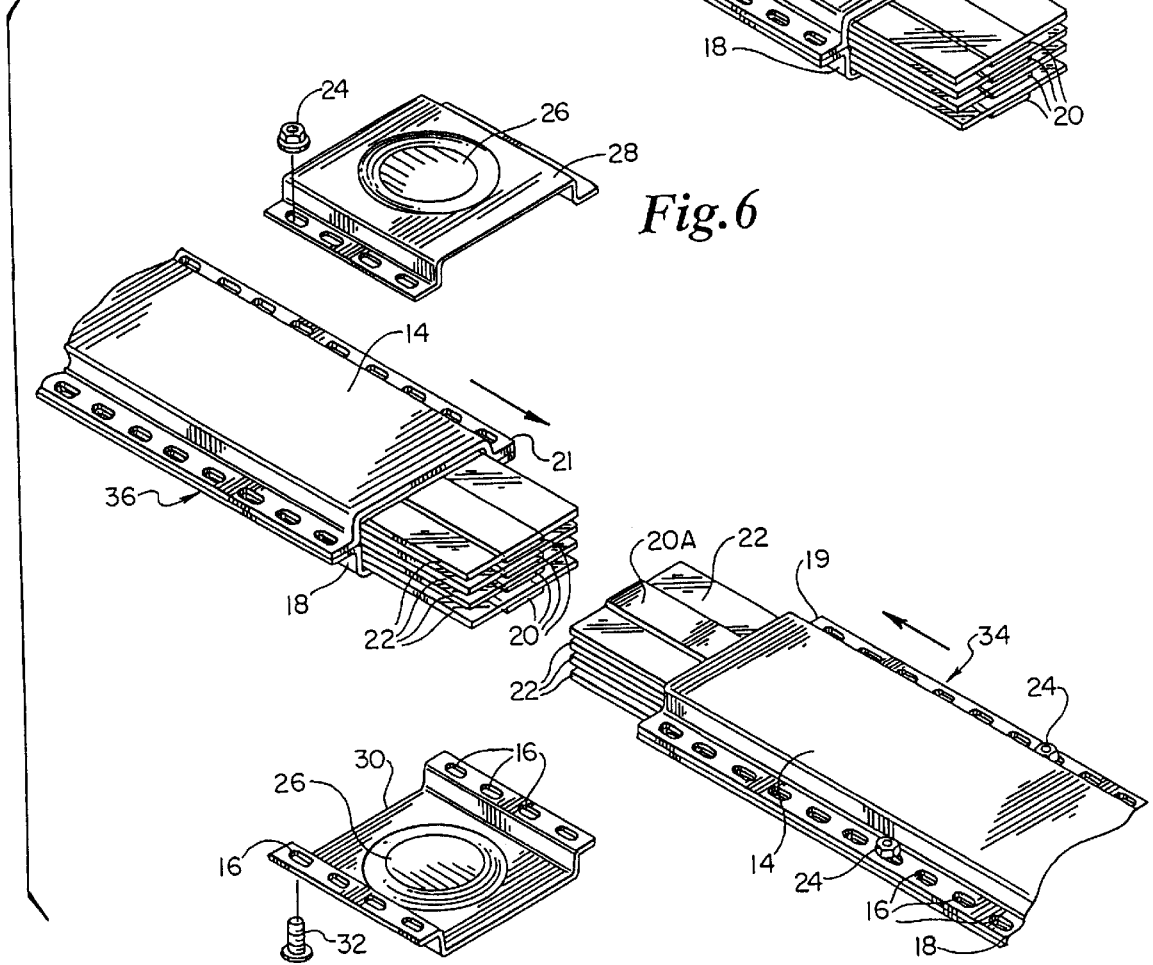
FIG. 6 is an exploded perspective view of the channel assemblies, each containing a plurality of bus strips, prior to connecting them with a two-piece clamp.

Several layers of double layer bus 20A &20B, may be accommodated by the bus housing 12 in this manner, as indicated in FIGS. 3, 4, 5, 6, & 8, and held in place by use of clamp 28, 30 with the addition of screw 32 and nut 24 or other fastening means, as illustrated in FIG. 5.

Figure 7:
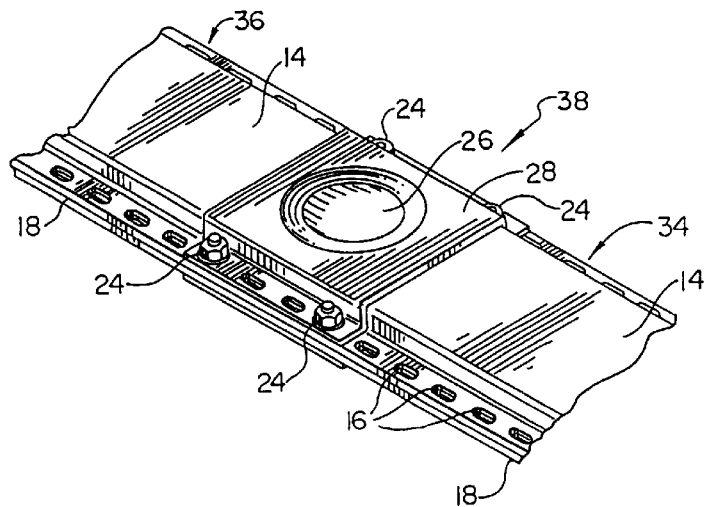
FIG. 7 is a fragmentary perspective view of the connected channel assemblies of FIG. 6, showing two-piece clamp in place.

Having a double layer of bus 20A & 20B enables easy coupling of the bus 20 because the two layers of the bus pair 20A & 20B are flat throughout and are positioned so they are offset from each other, 20A extending beyond end 19 and 20B extending beyond end 21. In this manner, the addition of a similarly positioned second bus assembly 34 shown at FIG. 6, the bus 20A layer of both the first bus assembly 36 and the second bus assembly 34 abut each other. Bus 20B layer of both the first bus assembly 36 and the second bus assembly 34 abut one another. The bus 20A overlaps the end of bus 20B at end 19. Bus 20B overlaps the end of bus 20A at end 21. The bus 20A & 20B layers both abut and overlap providing a strong joint that is held in place by clamp 28, 30. To restate this, coupling is accomplished by aligning the bus assemblies 34, 36 next to each other, bus 20A of second assembly 34, placed end to end abutting bus 20A of the first bus assembly 36. Bus 20A extends, metal side up, from the first end 19 of each bus assembly 34, 36. Bus 20B extends, metal side down, from the second end 21 of each bus assembly 34, 36. Positioned above and touching bus 20A of second assembly is bus 20B of first assembly 36. In actual use conditions, an approximately 6 inch (15 cm) total overlap has been used and is preferred although an overlap between 2 and 8 inches (5 and 20 cm) also can be used. This approximate 6 inch (15 cm) overlap, 3 inches (7.5 cm) within bus assembly 36 and 3 inches (7.5 cm) within bus assembly 34, results in a strong joint. The joint is held in place by two-piece clamp 28, 30. Both top clamp 28 and bottom clamp 30 have a dimple 26 formed therein, the dimple 26 formed toward the inside of the clamp 28,30 permitting additional pressure to be applied when clamping first bus assembly 36 to second bus assembly 34, the clamp 28,30 secured by use of a screw 32 and nut 24, although other fastening means could be used. FIG. 7 illustrates the coupled bus assemblies 34, 36 with clamp 28, 30 in place.

Figure 8:
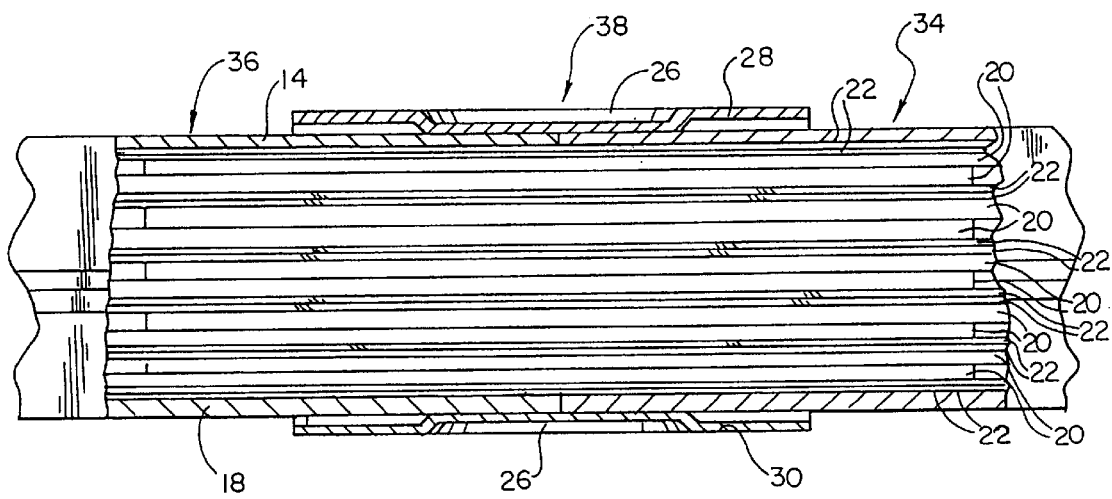
FIG. 8 is a cross-sectional view of the coupled channel assemblies of FIG. 7, taken along section line 8—8, showing the bus strips laying in place.
Figure 9:
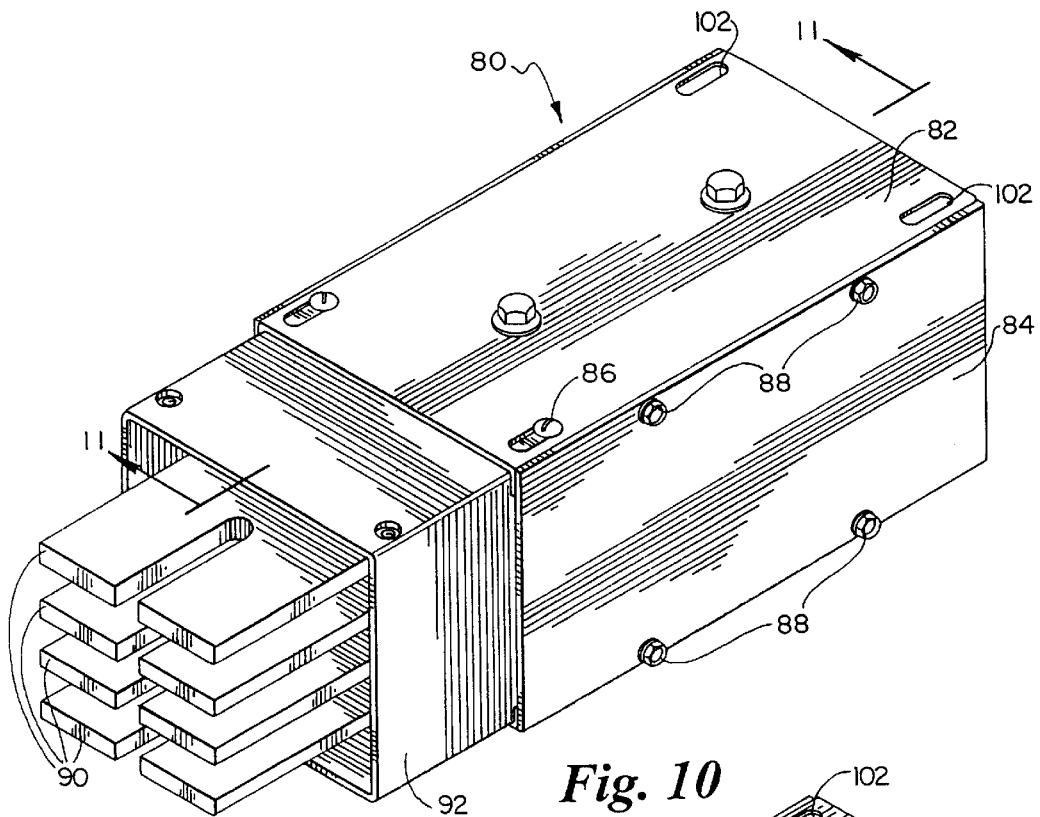
FIG. 9 is a perspective view of an alternate embodiment of the invention.

FIG. 8 shows the cross-sectional view of the layered bus assemblies 34, 36 coupled at FIG. 7. As can be seen here, two layers of bus form a bus pair 20A & 20B and two layers of insulation 22 separate each bus pair 20A & 20B from both top bus channel 14 and bottom bus channel 18 and from other bus pairs 20A & 20B. The lower bus 20A of each bus pair from a first bus assembly 36 abuts the lower bus 20A of each bus pair from a second bus assembly 34. The upper bus 20B of each bus pair from a first bus assembly 36 abuts the upper bus 20B of each bus pair from a second bus assembly 34. Bus 20B overlaps the butt joint formed when bus 20A of bus assembly 36 abuts bus 20A of bus assembly 34 at end 21 Conversely, at end 19 bus 20A overlaps the butt joint formed when bus 20B of bus assembly 36 abuts bus 20B of bus assembly 34. The addition of clamp 28, 30 holds the bus 20A & 20B in place allowing this overlap to strengthen the joint.

Additionally, having the length of bus 20 the same as the length of bus channels 14, 18 makes it easier to field cut the bus 20 to fit the particular dimensions at the site of use. All layers of bus 20 and bus channels 14,18 may be aligned and cut at the same time. To shorten, one needs only to manually align the ends of the bus 20 within a bus assembly 34 prior to being clamped to another bus assembly 36, and cut the bus 20 and the bus channels 14, 18 with a metal cutting saw, not shown. Then the bus 20 are manually positioned as described above, so that one end of bus 20B overlaps the bus channel 14, 18 at end 19 and the other end of bus 20A underlaps the bus channel 14, 18 at end 21.

A second embodiment 80, illustrated at FIGS. 9–17 is provided for use when the amperage reaches a point that the heat generated is greater than acceptable, generally above 225 amperes. In this second embodiment, metal slotted bus 90 are used to couple with a pair of stationary bus 104. Each slotted bus 90 is received by and sandwiched between a pair of stationary bus 104, the slotted bus 90 pushed into the pair of stationary bus 104 until slotted bus 90 abuts spacer disc 106 surrounding spacer bolt 100. Spacer bolt 100, illustrated at FIG. 12, having insulated spacer discs 106 retained thereon, when tightened, retains the slotted bus 90 to stationary bus 104 coupling. Again, the metal on metal of the pair of stationary bus 104 and of slotted bus 90 provides electrical communication therebetween and provides a good pathway for the electric current, the wider, heavier bus enabling additional electrical current to pass therethrough while the spacer discs 106 allow the heat, generated by the electrical current passing therethrough, to dissipate.

In this embodiment, a panel box 81, having a top panel 82, side panels 84 and a bottom panel 98, houses a series of stationary bus 104, positioned in pairs, spaced apart by spacer discs 106. Steel is currently preferred for making the panel box 81 but other metals, such as aluminum, plated aluminum, tin, chromium, copper, gold or silver or combinations thereof, could also be utilized. The pair of rectangular shaped stationary bus 104A & 104B receives a single slotted bus 90. Slotted bus 90 is also rectangular in shape and has a slot 108 formed in both short ends of the rectangle, generally in the middle of this end of the slotted bus 90. It is currently preferred to make stationary bus 104 and slotted bus 90 of plated aluminum but other metals, including such as aluminum, tin, chromium, copper, gold, silver or combinations thereof, could also be utilized. A bolt hole 110 is formed in either end at a predetermined distance of stationary bus 104 for receiving spacer bolt 100. A series of bolt holes 110 could be formed in stationary bus 104 of greater lengths. Spacer bolt 100 holds an assembly of stationary bus pairs 104A & 104B in position.

Figure 10:
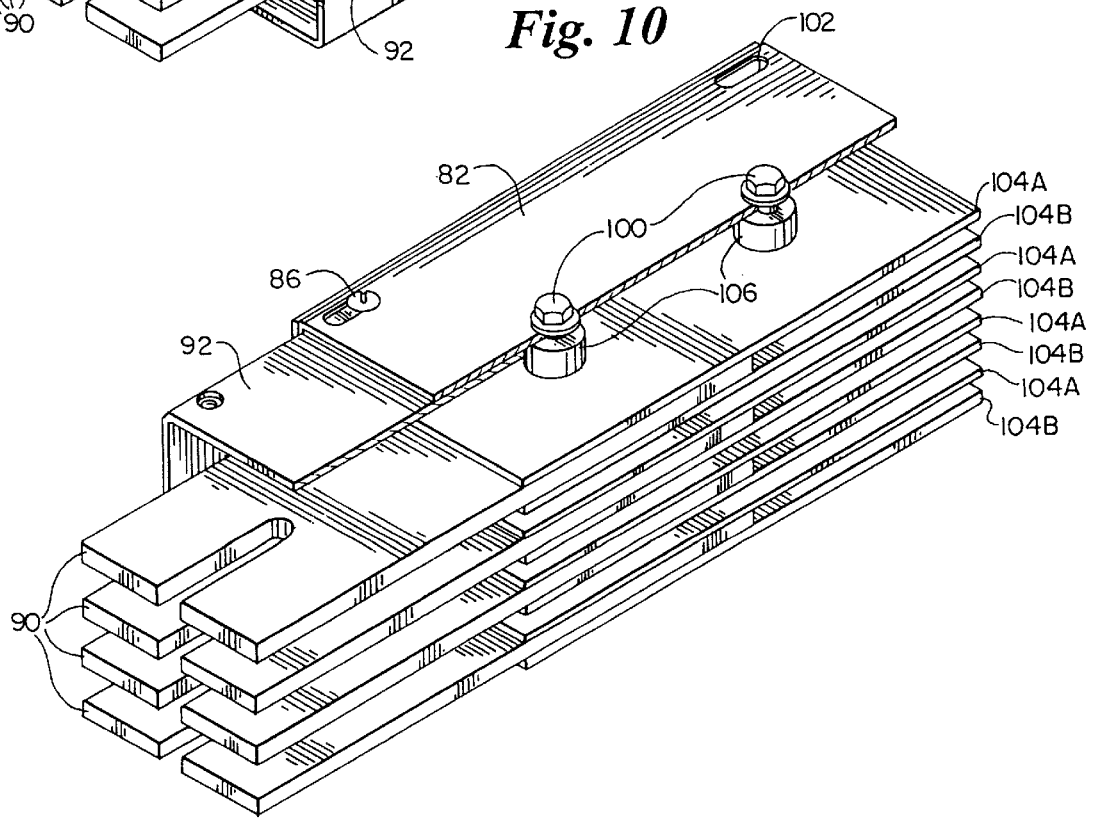
FIG. 10 is similar to FIG. 9, with certain portions removed to facilitate understanding.
Figure 11:
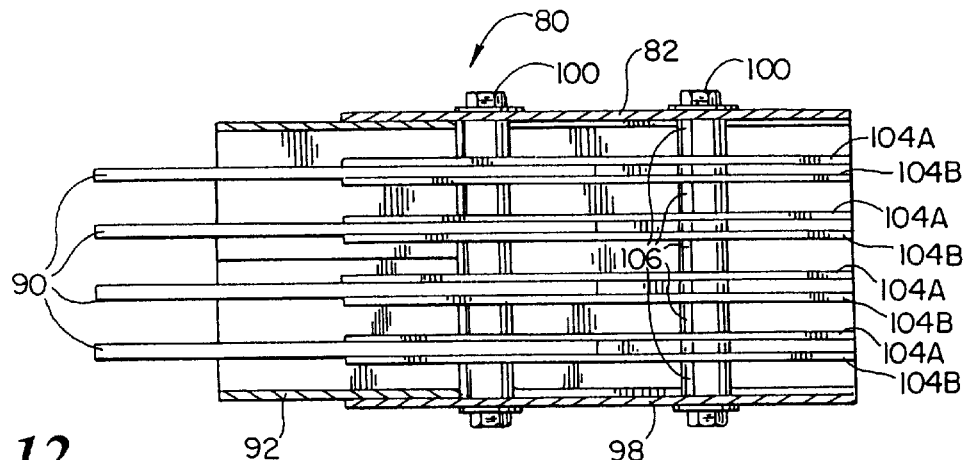
FIG. 11 is a cross-sectional view of the assembly of FIG. 9, taken along section lines 11—11, looking in the direction of the arrows.
Figure 12:
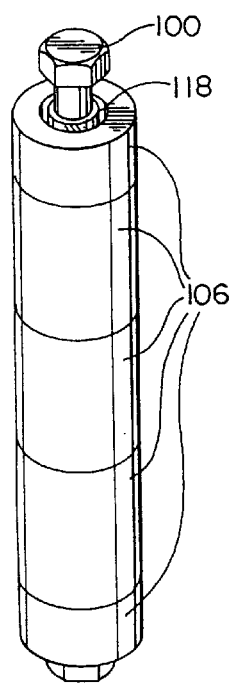
FIG. 12 is a perspective view of the insulated bolt surrounded by spacer discs.
Figure 11A:
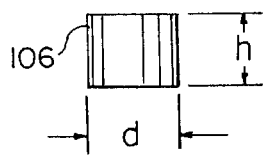
FIG. 11a is an enlarged side view of a portion of one of the spacer discs shown in FIG. 11.

Insulated spacer discs 106, of fiberglass board material, are used to insulate the metal bolt 100 from the electricity passing through the slotted bus 90 and from stationary bus 104. Slotted bus 90, used as a coupler, may be included in bus assembly 80, as illustrated at FIG. 10 and 11, or the slotted bus 90 can be used at time of coupling two such bus assemblies 80 by coupling pairs of stationary bus 104A & 104B. Insulated spacer discs 106 are used to space the stationary bus 104A & 104B apart from each other and apart from the panel box 81.

An insulation tube 118, preferably formed of Mylar® is used to insulate bolt 100 from both the stationary bus 104 which bolt 100 positions, and insulate bolt 100 from slotted bus 90 which is positioned and retained within the stationary bus 104 pair. A series of spacer discs 106 surround bolt 100 and aid in the positioning of the pairs of stationary bus 104 in relation to each other and to the housing.

Figure 13:
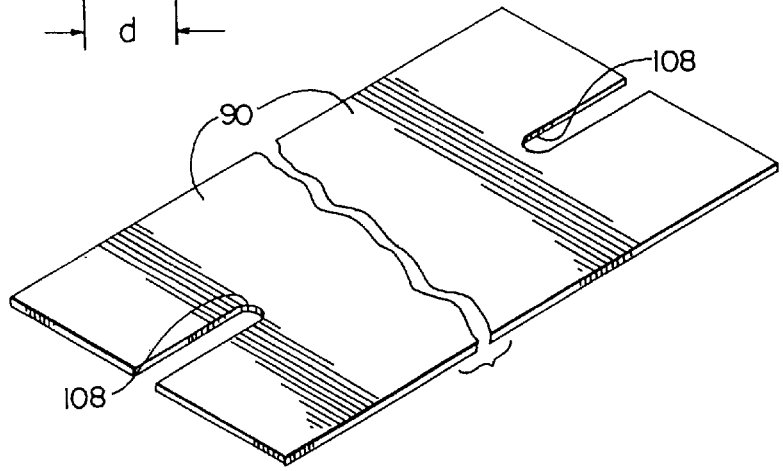
FIG. 13 is a perspective view of one of the slotted bus strips in FIGS. 9–11.
Figure 14:
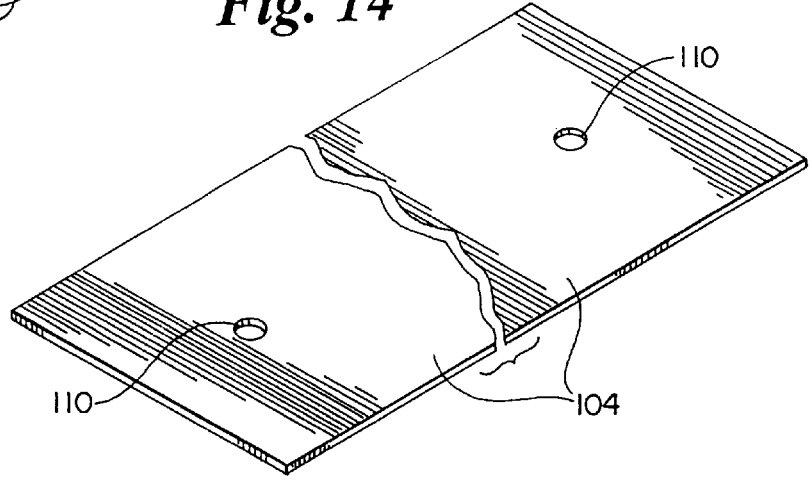
FIG. 14 is a perspective view showing one of the stationary bus strips of FIG. 9–11.

As indicated by broken line in FIGS. 13 and 14, both the slotted bus 90 and stationary bus 104 may be of varying lengths as needed. The bus assembly 80 may be made with the stationary bus 104 assembled and separated by spacer discs 106 and held in position by bolt 100 and the slotted bus 90 used as a coupling bus. Alternatively, bus assembly 80 may be assembled, spacer discs 106 spacing stationary 104A & 104B apart and held in position by bolts 100 with slotted bus 90 used to couple the bus assembly 112 to another such bus assembly 114. Any number of bus conductors 80 may be accommodated with this system. This bus conductor 80 provides a metal conductor that is stable at its joints and one that can accommodate large amperage electrical current, i.e. greater than 225 amp.

Figure 15:
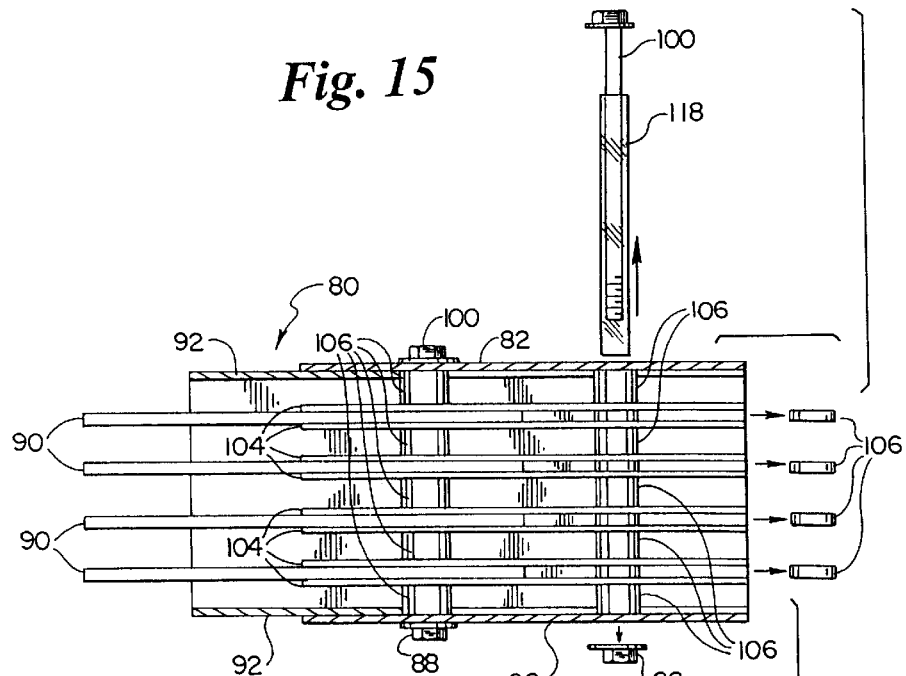
FIG. 15 is similar to FIG. 11 demonstrating the removal of spacer discs.
Figure 16:
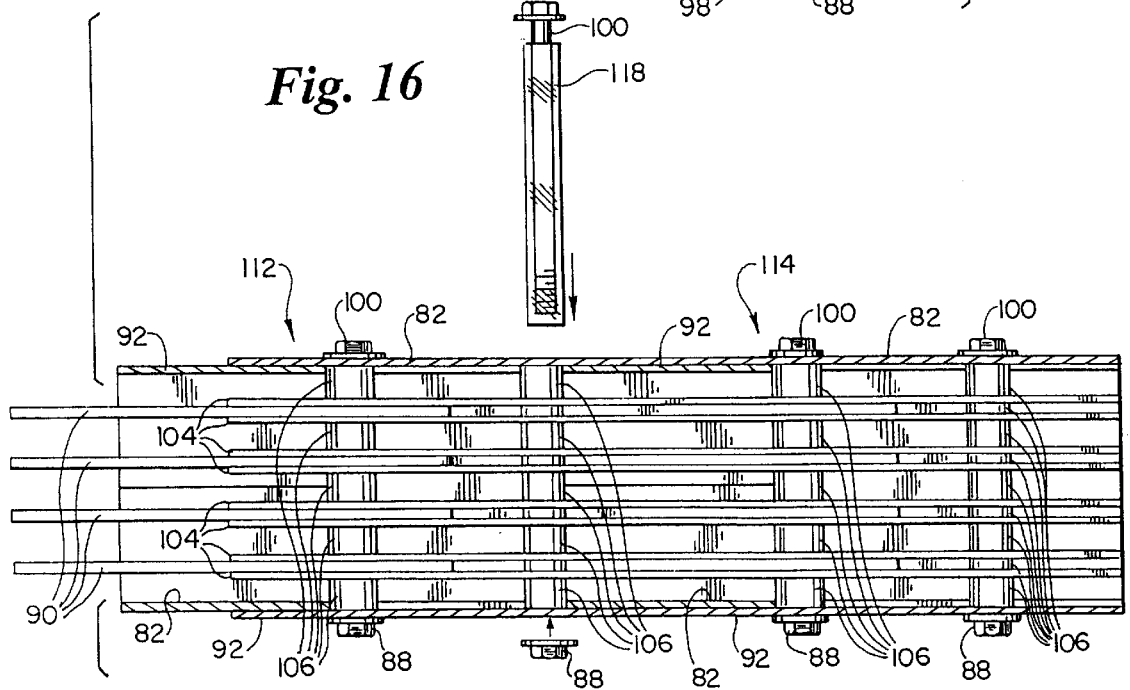
FIG. 16 is similar to FIG. 15 but illustrating the placement of an adjoining bus assembly.

In FIG. 15, a single slotted bus 90 is shown received by pairs of stationary bus 104A & 104B and held in position by bolt 100. An additional bolt 100 is shown withdrawn from the bus assembly 80 as during assembly of second embodiment bus assembly 80. Also indicated, some spacer discs 106 are also shown outside the assembly 80 as they appear during assembly. FIG. 16 illustrates two second embodiment bus assemblies 112,114 coupled together by a series of slotted bus 90. Again, the assemblies are held together by a series of spacer bolts 100.

Figure 17:
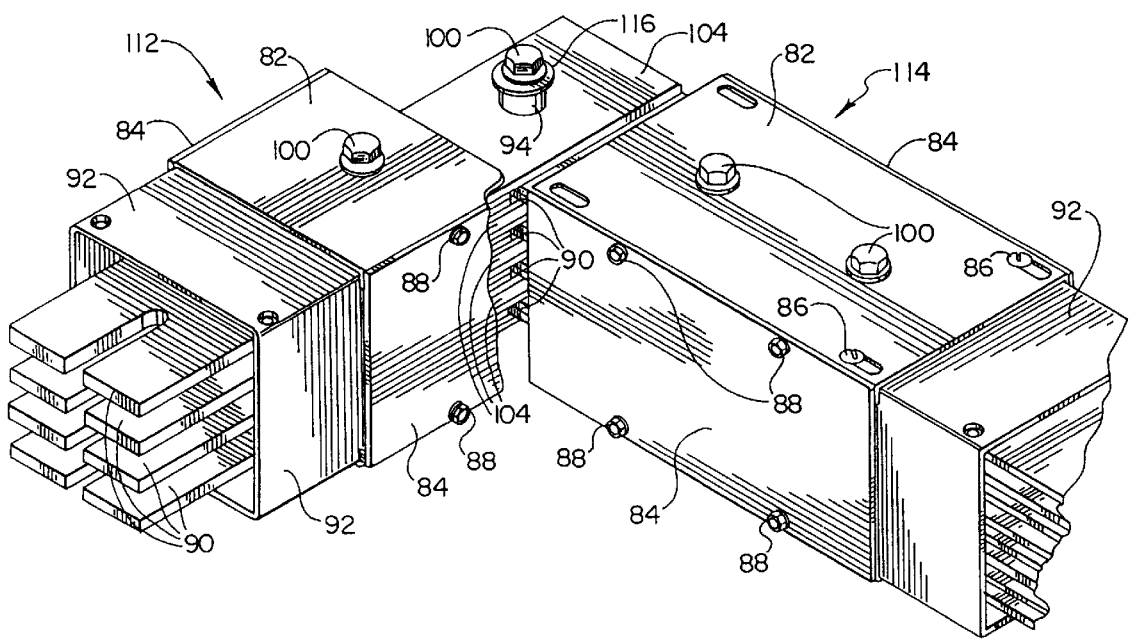
FIG. 17 is a perspective view illustrating the manner in which two bus assemblies may be connected at 90°, certain portions being removed to facilitate understanding.

FIG. 17 illustrates the second embodiment used to form an elbow joint. It also could be similarly used to form a T-shaped joint or a tap off where a plug-in could be provided to access the electrical current passing through the bus of this embodiment. In FIG. 17 the top 82 and side panels 84 have been removed leaving the stationary bus 104 of the first assembly 112 exposed for coupling with the slotted bus 90 of the second assembly 114. Each slotted bus 90 is positioned, sandwiched between two stationary bus 104, and held in place by bolt 100. Adjustment screws 86, when tightened, hold in position connection panel 92. Normally, connection panel 92 is received and retained by housing panel box 81. When adjustment is needed between two housings, connection panel 92 may be pulled out slightly, and secured in position by adjustment screws 86, to aid in totally covering bus assembly 80 with a housing.

Both bus systems described above may be used where a heavy load of electricity is used. A series of first embodiment bus assemblies 10 may be positioned along a wall or other stable surface to direct electrical current from the point of entry into a building to a point of use. Bus assemblies 10 come in a variety of lengths and may be cut, as described above, on-site to fit the particular dimensions needed. Bus assemblies 10 may be coupled, as described above, to provide continuous electrical conductivity to the point of use. At the point of use, a tap-off is positioned to provide means to access the electrical current. If the point of use changes, the bus assemblies 10 may be removed from the wall or other surface and re-attached at a new site.

The second embodiment bus assembly 80 also comes in a variety of lengths and may be coupled, as described above, to fit the desired dimensions of an individual installation. At the point of use, a tap-off is provided to allow access to the electrical current carried by the bus assembly 80.

It is an important advantage to have a double layer of metal in each bus. This double layer of metal enables increased amounts of electricity to be conducted by either of these bus assemblies. Additionally, in the first embodiment bus assembly 10, having a flat, double layer of metal allows a bus lap joint with no separate bus connector required, providing a built-in coupler in each end of each length of bus and busway.

It is an important advantage of the present invention that the bus may be easily cut on-site to provide bus of desired dimensions. It is an additional advantage that the bus herein described can easily be recycled when the machine being fed electricity by the bus is relocated.

Additionally, having built-in dimpled washers in the clamp increases the clamping pressure applied to the bus couplings while simplifying the procedure of making the coupling. Having at least two flat, layers of metal bus provides a strong bus joint and provides good conductivity and a ground to be maintained through pressure on the housing and joint covers.

The use of plated aluminum is important because the bus and busway are corrosion resistant without the additional step of painting the busway. An outdoor embodiment may be provided with a weather-proof gasket.

Although the present invention has been described in considerable detail with reference to certain preferred versions thereof, other versions are possible. Therefore, the spirit and scope of the appended claims should not be limited to the description of the preferred versions contained herein.

What is claimed is:

1. An electrical bus assembly, comprising:

1) a coupled electrical bus conductors including a) a first pair of planar stationary electrical bus conductors providing a double layer of electrical bus enabling carrying higher electrical loads relative to wire circuitry, each first stationary bus conductor having apertures formed therein;

b) a second pair of planar stationary electrical bus conductors providing a double layer of electrical bus enabling carrying higher electrical loads relative to wire circuitry, each second stationary bus conductor having apertures formed therein;

c) a slotted planar electrical bus conductor electrically coupling said first and second pairs of bus conductors; one end of said slotted connecting bus conductor being sandwiched between said first pair of electrical bus conductors and second end of said slotted connecting bus conductor being sandwiched between said second pair of electrical bus conductors, providing a single layer of electrical bus therebetween;

d) insulation means comprising discs of fiberglass board insulation material positioning the conductors of said pairs of electrical bus conductors apart and allowing receipt of said slotted connecting electrical bus conductor therebetween;

2) a panel box housing, having a central bore, for enclosing said coupled electrical bus conductors; and 3) fastening means comprising an insulated bolt-tightening element passing through said bore, connecting a slot of said slotted connecting electrical bus conductor and said apertures of said pair of stationary electrical bus conductors for tightening and protecting the assembly.

2. The electrical bus assembly of claim 1, wherein each of said double layer of bus conductor being wider, heavier metal bus conductor that can carry an electrical load of greater than 225 amperes.

3. The electrical bus assembly of claim 1, wherein said pairs of electrical bus may be aligned and field cut to the desired dimension prior to being coupled by said slotted connecting bus conductor.

* * * * *